FREQUENCY BAND TRANSFORMER

Filed Dec. 17, 1953

2 Sheets-Sheet 1

INVENTOR.
FRIEDRICH VILBIG
BY Wade Koontz AND Herold H. Zofcke
ATTORNEYS

INVENTOR.
FRIEDRICH VILBIG
BY Wade Koontz and Harold H. Loeske
ATTORNEYS

United States Patent Office 2,883,465

Patented Apr. 21, 1959

2,883,465

FREQUENCY BAND TRANSFORMER

Friedrich Vilbig, Cambridge, Mass., assignor to the United States of America as represented by the Secretary of the Air Force Application December 17, 1953, Serial No. 398,905

12 Claims. (Cl. 179—15.55)

(Granted under Title 35, U.S. Code (1952), sec. 266)

The invention described herein may be manufactured and used by or for the United States Government for governmental purposes without payment to me of any royalty thereon.

This invention relates to frequency band transformers and more particularly to a means to mutiply or divide or invert a frequency band in any ratio through the use of magnetostriction filters, or the like, for speech compression and expansion.

The customary approach to frequency band multiplication is by applying the frequency band to a nonlinear circuit such as a rectifier. Unfortunately, together with the desired multiple frequencies $2W_1$, $2W_2$, etc., strongly interfering difference frequencies $(W_1-W_2)$, and sum frequencies $(W_1+W_2)$ are formed with large amplitudes. While it is simple to suppress interfering difference frequencies by the use of simple filters, it is very difficult to eliminate the sum frequencies.

These objectionable sum frequencies can be eliminated by subdividing the original frequency band into many individual narrow frequency bands, preferably one frequency to each band. The output of each of these narrow frequency bands is then applied to a separate nonlinear circuit such as a rectifier so they can be multiplied individually. But this procedure causes severe technical difficulties and results in a very high cost.

In the present invention the frequency transformer consists generally of a frequency analyzer and a frequency synthesizer using magnetostriction filters with small bandwidths of approximately 30 cycles. The individual filters of the synthesizer have their frequencies progressively overlapping at the half power points and are excited by a random noise. Electrostatic pickups are used, one for each individual synthesizer filter. A direct current potential is switched on or off to each magnetostriction bar to switch the corresponding filter on or off and the voltage of the direct current potential is controlled to vary the volume of the filter. The analyzer consists of similar magnetostriction filters which may be excited by a frequency band. By combining the outputs of the analyzer and the filters of the synthesizer, the frequency band may be multiplied, divided, inverted, or transformed in any possible ratio. It is therefore a general object of this invention to provide a means to multiply or divide a frequency band in any ratio.

A further object of this invention is to provide a means for multiplying or dividing a frequency band without the production of objectionable interfering sum or difference frequencies.

These and other objects, advantages, features, and uses will become more apparent as the description proceeds when considered with the accompanying drawings, in which.

Figures 1, 2, 3, 4:
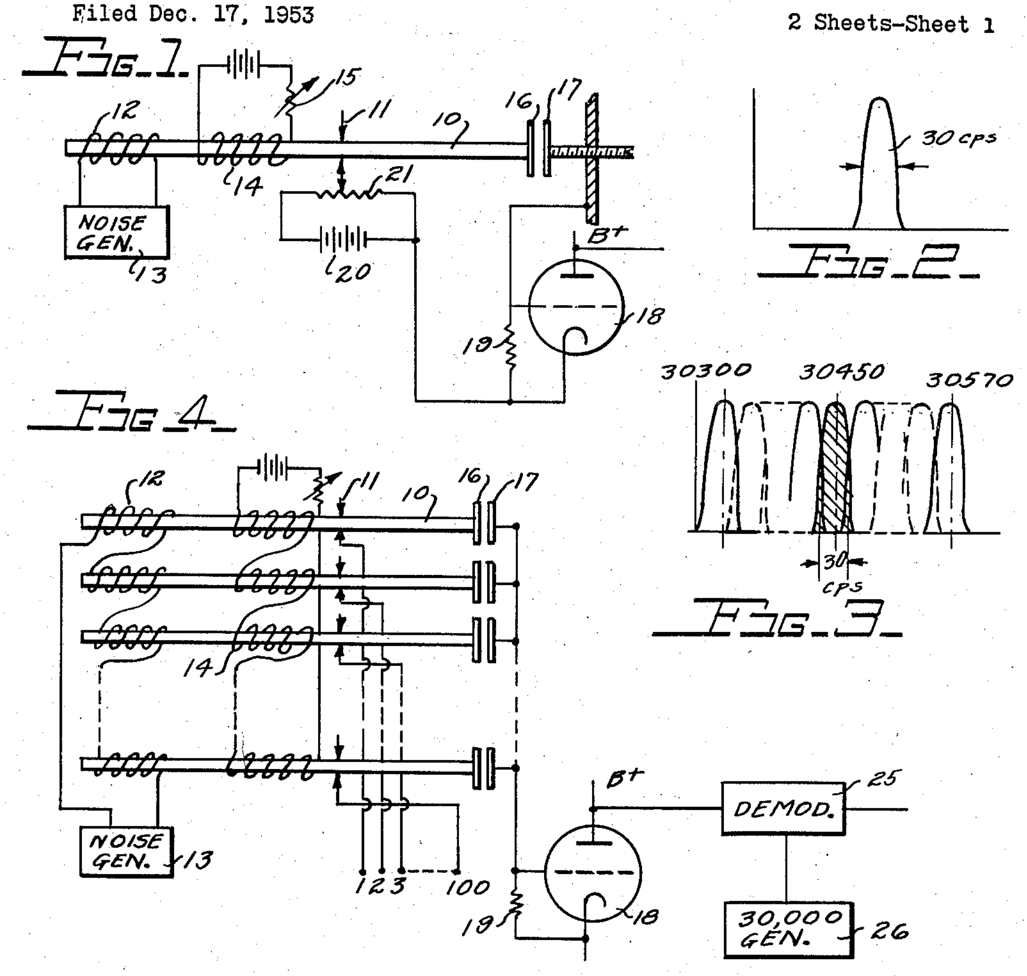
Fig. 1 illustrates a single magnetostriction filter as used in the synthesizer.
Fig. 2 illustrates a single envelope of the resonance frequency of the filter in Fig. 1.
Fig. 3 illustrates a plurality of frequency envelopes from a plurality of filters in a frequency range of 30,300 to 30,570 cycles per second.
Fig. 4 illustrates a synthesizer circuit.

Referring more particularly to Fig. 1, there is illustrated a magnetostriction filter element of the type used in this invention in which a magnetostriction bar 10 is supported at its central nodal point by a holding means 11. The magnetostriction bar is excited by the exciting coil 12 which is in circuit with a noise generator 13. A second coil 14 is coupled to a direct current voltage source, as a battery or the like, through a variable resistor 15. The coil 14 provides the magnetic field in the magnetostriction bar 10 which field is controllable by the element 15. The coil could be replaced by a permanent magnet. The other end of the magnetostriction bar 10 has a condenser plate 16 thereon in spaced relation with a companion condenser plate 17, the latter of which is electrically connected to the grid of a triode tube 18. The grid is connected to the cathode through a grid resistor 19 and the cathode is connected to the negative pole of a voltage source, illustrated as a battery 20. A potentiometer 21 connected across the voltage source has the movable tap thereof electrically connected to the support or holding means 11 of the magnetostriction bar 10. With constant excitation by the noise generator 13, the amplitude of the filter output at the plate of tube 18 can be regulated by the potentiometer 21.

The output of the tube plate will produce a wave envelope substantially as shown in Fig. 2 which has a bandwidth of about 30 cycles per second (c.p.s.). If a plurality of magnetostriction filters are used having 30 c.p.s. bandwidth and of frequencies overlapping at the half power points, for example from 30,300 c.p.s. to 30,570, wave forms will be produced as shown in Fig. 5 in which the cross-hatched wave form represents the middle filter output of about 30,450 c.p.s.

A plurality of magnetostriction filters can be arranged as illustrated in Fig. 4 in which all the magnetostriction bars are excited by the single noise generator 13 and the electrostatic pickups 17 are all coupled together and connected to the grid of tube 18. The tuning voltages impressed on the magnetostriction bar supports 11 can be controlled and turned on or off by switches, as will later become clearer. The anode output of the tube 18 is coupled through a demodulator 25 having a superimposed carrier frequency of 30,000 c.p.s. thereon from the generator 26. If the resonance frequency of one of the filters is, for example, 30,300 c.p.s. a noise spectrum at the output will be from about 30,285 to 30,315 c.p.s. For a speechband of 100 to 3100 c.p.s. a filter component is needed having (3100–100): 30=100 elementary filters each with a 30 c.p.s. single-filter bandwidth. The resonance frequencies of the elementary single filters are then 30,100, 30,130, 30,160–33,030, 33,060, and 33,090. By switching the tuning voltages, 1 to 100, to the magnetostriction bar supports 11 on and off, output frequency spectrums similar to voice spectrums can be produced.

Figure 5:
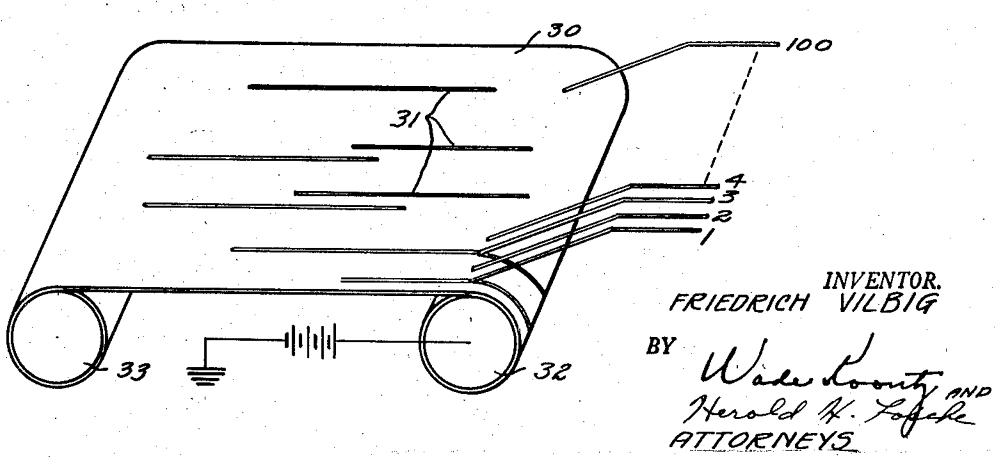
Fig. 5 illustrates a visible speech tape or film with pick-up brushes for each speechband.

The switching of these tuning voltages may be effected, as shown in Fig. 5, by a visible speech film as a paper tape 30 with conducting strips 31 thereon. The pattern of speech can be "written" on the tape with a liquid which makes the tape conducting at these places. The tape is transferred from one roller 32 to another 33, the one roller 32 being electrically conducting and connected to a direct current voltage. Electrically conducting fingers from 1 to 100, each spaced along the roller 32 and having a brush end touching the tape in the respective paths of the conducting strips 31, are capable of being connected to the corresponding tuning voltage conductors 1 to 100 of the filter circuit of Fig. 4. Each finger corresponds by its position to a certain frequency and gives the proper voltage to the corresponding magnetostriction bar. The pattern of the tape 30 therefore is capable of tuning the output spectrum.

Figure 6:
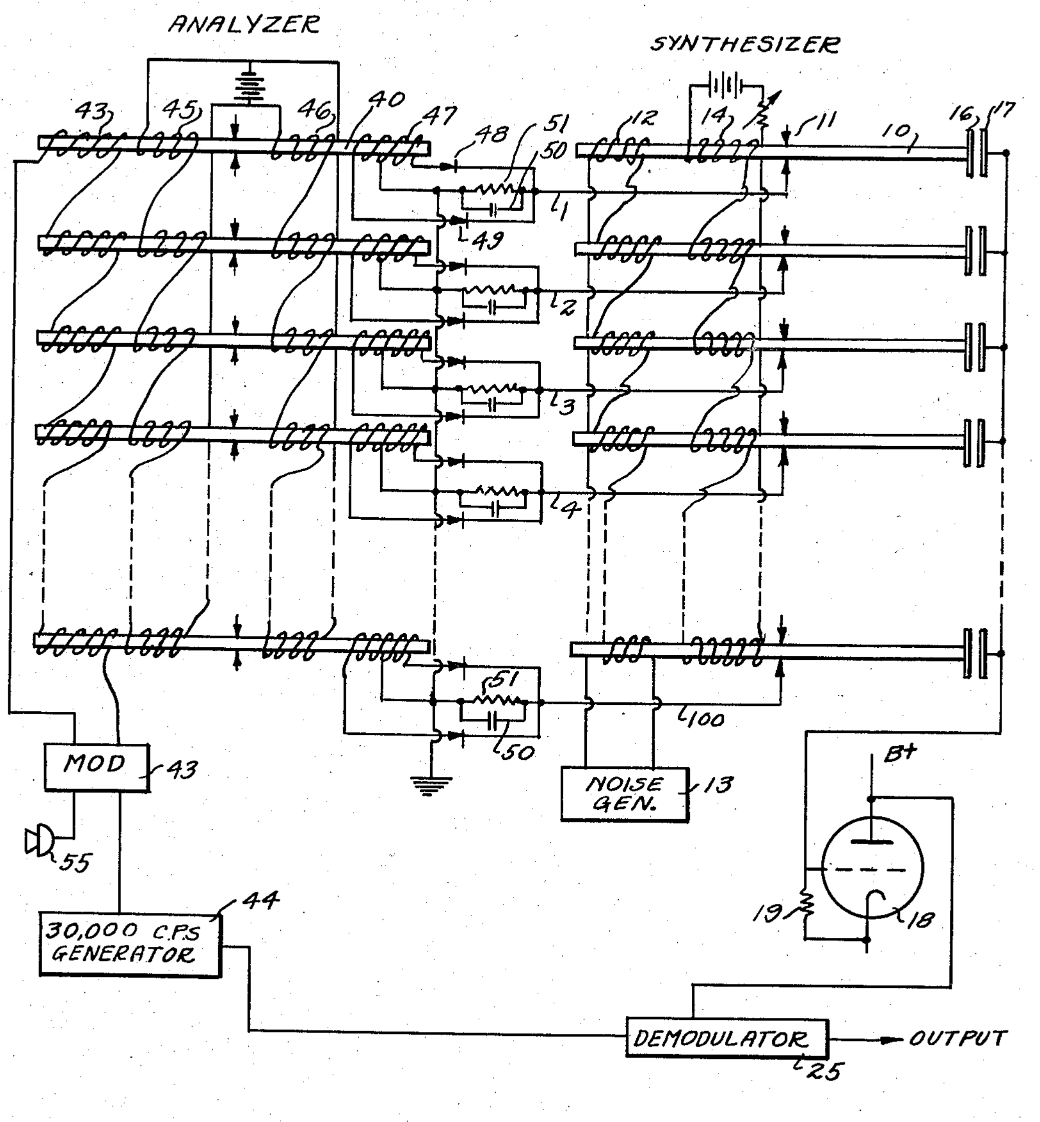
Fig. 6 illustrates an analyzer-synthesizer circuit as used in this invention to multiply and divide frequency bands.

The above circuits provide a spectrum synthesizer which is used with an analyzer to multiply or divide the frequency bands, as shown in Fig. 6. In the analyzer circuit, magnetostriction bars 40 are centrally supported at the nodal points by a holding means 41 of any suitable construction. An exciting coil 42 on each bar is connected in series with the other exciting coils all of which are connected through a modulator 43 to a frequency generator 44. The coils 45 and 46 providing the direct current fields to the magnetostriction bars 40 are arranged in push-pull order. The coils 45 and 46 could be replaced by permanent magnets. Each single output coil 47 is a push-pull coil with the center tap grounded and the coil ends each rectified in the rectifiers 48 and 49. This is necessary for the suppression of the fundamental frequency which would otherwise appear immediately in the synthesizer. The double and higher frequencies or harmonics are suppressed by the parallel arrangement of the condenser 50 and resistor 51 in each rectifier circuit. The carrier frequency provided by the frequency generator 44 is modulated by speech spectrums put in through the microphone 55 through the modulator 43 of the analyzer. The frequency generator capable of being modulated by speech from 30,000 c.p.s. to 33,000 c.p.s. causes excitation of the output coils 47 falling within the excitation range to produce direct current potentials in the output leads 1 to 100.

The synthesizer circuit is substantially the same as that shown and described with reference to Fig. 4. The output leads 1 to 100 are connected to the support means 11 of each of the corresponding elementary synthesizer filters whereby the direct current output potentials in each of the analyzer output leads 1 to 100 will control the amplitude of the corresponding synthesizer filter. The frequency generator 44 is also connected to the demodulator 25 to provide a carrier in the synthesizer circuit although separate frequency generators may be used.

In the operation of the device, 900 c.p.s., taken as an example of speechband frequency, will be changed into the sideband frequencies 29,100 and 30,900 of the 30,000 c.p.s. carrier. Only the upper sideband frequency of 30,900 is used. This frequency of 30,900 c.p.s. excites a correspondingly tuned magnetostriction filter of the analyzer which causes a direct current potential to appear in the output thereof corresponding to the amplitude of 30,900 c.p.s. or 900 c.p.s. This direct current potential is impressed on the corresponding magnetostriction synthesizer filter bar 10 at its support 11 which may have the same or a different resonance frequency, as will be more fully explained herein below. Assuming for the purpose of the examples that the corresponding analyzer and synthesizer magnetostriction bars have the same resonant frequency, the synthesizer elementary filter will produce a band output of 30 c.p.s. whose middle frequency is 30,900 c.p.s. Each elementary filter of the synthesizer filter component is readily responsive to the direct current potentials of their companion analyzer filters since the synthesizer elementary filters are all excited by the noise generator. The frequency band of the synthesizer having the same carrier frequency of 30,000 c.p.s. superimposed thereon as the frequency band in the analyzer the signal of 900 c.p.s. will appear at the output of the demodulator 25. If all of the elementary filters of the synthesizer are coupled to the elementary filters in the analyzer of the same frequency, the whole speechband impressed by the microphone 55 will be transmitted without frequency change.

By coupling the analyzer elementary filters and the synthesizer elementary filters in other frequency ratios or reverse ratios, frequency band multiplication and division, or inversion can be accomplished in any ratio. For example, if the analyzer elementary filter responsive to the frequency 30,900 (used in the example above) is coupled to a synthesizer elementary filter responsive to 30,450 c.p.s., the original frequency would be halved at the output from the modulator 25. Thus, by arranging the analyzer and synthesizer elementary filters in different frequency ratios a frequency band transformer is provided.

Magnetostriction filters were used herein to illustrate the invention although it is to be understood that other types of filters may be used such as string filters, reed filters, quartz filters, etc. with substantially the same results. The use of magnetostriction filters is preferred merely because they are easy to construct and require little space. The electrostatic pickups on the synthesizer elementary filters are preferred because they perform satisfactorily with a simple circuit, although magnetic or other types of pickups may be used. If magnetic pickups or other pickups are used, a separate tube for each pickup would be necessary to accomplish the same results of the single tube now used for all the elementary filters.

Although a preferred form of this invention has been shown and described it is to be understood that many different embodiments may be made in the constructional details and features without departing from the spirit and scope thereof, it being further understood that the invention shown is illustrative and not to be interpreted in the limited sense, wherefore I desire to be limited only in the spirit and scope of the appended claims.

I claim:

1. A frequency band transformer comprising a frequency analyzer having a plurality of means for converting a wide band of frequencies into a plurality of component narrow band frequencies, means to convert each of said narrow band frequencies into an output potential proportional to the amplitude of the frequencies in the narrow band, a frequency synthesizer having a plurality of means for connecting the wide band of frequencies into a plurality of narrow bands of frequencies, means connected to said frequency synthesizer for continually generating a continuous band of frequencies, means connecting the output potential of each analyzer narrow band frequency means to a synthesizer narrow band frequency means to maintain the output voltage of said synthesizer narrow band frequency means in correspondence with the analyzer output voltage, said analyzer and synthesizer narrow band frequency means operating in any desired frequency ratio wherein the output frequency band is transformed in the same ratio, said plurality of means for connecting a wide band of frequencies into a plurality of narrow band frequencies comprising a plurality of magnetostrictive filter bars, and a coil positioned in surrounding relation to each of said magnetostrictive bars adjacent the ends thereof and in circuit with a rectifying means to produce said analyzer output potential.

2. A frequency band transformer as set forth in claim 1 wherein said coil over the end of each magnetostrictive bar is a push-pull coil, full wave rectifying means connected to the ends of the push-pull coil for suppression of the fundamental frequencies.

3. A frequency band transformer as set forth in claim 2 wherein said synthesizer narrow frequency band means are magnetostrictive bars.

4. A frequency band transformer as set forth in claim 3 wherein the output means on each synthesizer magnetostrictive bar comprises an electrostatic pickup.

5. A frequency-band transformer comprising; a frequency analyzer consisting of a plurality of magnetostriction filters excited by a carrier frequency modulated by a frequency band, rectifying means connected to each filter for rectifying its output signal, means to establish a magnetic field, a frequency synthesizer including a plurality of magnetostriction filters, each being connected to one of the analyzer magnetostrictive filters, and having means for setting up a magnetic field in them, and each having excitation means for producing mechanical vibrations at the tuned frequency in overlapping relation at the half power points, said couplings being arranged in a ratio of the tuned frequencies of the analyzer and synthesizer filters; electrostatic means for each synthesizer filter for converting the tuned mechanical vibration thereof into electrical frequencies; means coupling the electrical frequencies of all said electrostatic means and impressing a carrier frequency thereon; and means for demodulating the synthesized frequencies produced from the analyzed frequency band whereby the resulting synthesized frequencies are multiplied or divided from the analyzed frequency band frequencies in a ratio determined by the analyzer-synthesizer filter coupling relation.

6. A frequency-band transformer as set forth in claim 5 wherein said magnetostriction filters of said synthesizer each includes a magnetostriction bar supported at its central nodal point and the coupling from said analyzer output means is at this support.

7. A frequency-band transformer as set forth in claim 6 wherein said rectified electromagnetic output means consists of push-pull coils and a full wave rectifier for the suppression of the fundamental frequencies, said means establishing a magnetic field in each analyzer filter comprising a push-pull coil energized by a direct current.

8. A frequency-band transformer as set forth in claim 7 wherein said excitation means of said synthesizer magnetostriction filters is a noise generator coupled to coils around each magnetostriciton bar.

9. A frequency band transformer comprising a frequency analyzer having a plurality of magnetostrictive filters excited by a carrier frequency modulated by input speech band frequencies, rectifying means connected to each filter for rectifying the filter's output signal, each filter having a magnetostrictive bar and means to establish a magnetic field in the magnetostrictive bar, a frequency synthesizer including a plurality of magnetostrictive filters, each being connected to one of the analyzer magnetostrictive filters, and having means for setting up a magnetic field in the magnetostrictive bar, said synthesizer filters having excitation means for producing magnetostrictive vibrations at the tuned frequency in overlapping relation to the half power points, the frequencies of said analyzer and synthesizer magnetostrictive filters being in any desired ratio, electrostatic output means on each synthesizer filter, means connecting the output means of all the synthesizer filters together, means for impressing a carrier frequency thereon, demodulation means for demodulating the synthesized frequencies, so that the resulting frequency band width is in the same ratio to the input frequency band width, as the frequencies in the synthesizer filters to the frequencies in the analyzer filters are.

10. A frequency band transformer as set forth in claim 9 wherein the magnetostrictive filters of said synthesizer includes a magnetostrictive bar supported at the central nodal point, and the connection from the analyzer output means is at the support.

11. The invention set forth in claim 10 wherein the rectifying means includes push-pull coils, full wave rectifiers connected to the ends of said push-pull coils for the suppression of fundamental frequencies, and wherein said means for establishing a magnetic field in each analyzer filter is a push-pull coil coaxially mounted on the magnetostrictive bar and energized by a direct current.

12. The invention set forth in claim 11 wherein the excitation means in the synthesizer magnetostrictive filters is a noise generator coupled to coils around each magnetostriction bar.

References Cited in the file of this patent

UNITED STATES PATENTS

| | | |
|---|---|---|
| 1,719,484 | Norton | July 2, 1929 |
| 2,151,091 | Dudley | Mar. 21, 1939 |
| 2,302,895 | Root | Nov. 24, 1942 |
| 2,458,227 | Vermeulen et al. | Jan. 4, 1949 |
| 2,571,019 | Donley et al. | Oct. 9, 1951 |

FOREIGN PATENTS

| | | |
|---|---|---|
| 611,533 | Great Britain | Nov. 1, 1948 |